(12) United States Patent
Dietz

(10) Patent No.: US 6,302,139 B1
(45) Date of Patent: Oct. 16, 2001

(54) AUTO-SWITCHING GAS DELIVERY SYSTEM UTILIZING SUB-ATMOSPHERIC PRESSURE GAS SUPPLY VESSELS

(75) Inventor: James Dietz, Danbury, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/356,020

(22) Filed: Jul. 16, 1999

(51) Int. Cl.[7] .............................. B08B 9/027; B08B 5/00; G05B 11/01; G06F 15/00
(52) U.S. Cl. ...................... 137/240; 134/95.1; 134/98.1; 134/166 C; 134/171; 137/15.04; 137/597; 222/148
(58) Field of Search ...................... 137/240, 597, 137/884, 15.04, 15.05; 134/94.1, 95.1, 98.1, 99.1, 166 C; 222/148

(56) References Cited

U.S. PATENT DOCUMENTS

| | | |
|---|---|---|
| 4,383,547 * | 5/1983 | Lorenz et al. ...................... 137/240 |
| 4,869,301 * | 9/1989 | Ohmi et al. ........................... 137/240 |
| 4,917,136 * | 4/1990 | Ohmi et al. ........................... 137/240 |
| 5,137,047 * | 8/1992 | George ................................. 137/240 |
| 5,152,309 | 10/1992 | Twerdochlib ......................... 137/8 |
| 5,158,534 | 10/1992 | Berry et al. ............................. 604/4 |
| 5,190,068 | 3/1993 | Philbin ................................. 137/8 |
| 5,313,982 * | 5/1994 | Ohmi et al. ........................... 137/597 |
| 5,368,062 * | 11/1994 | Okumura et al. ..................... 137/240 |
| 5,441,070 | 8/1995 | Thompson ............................. 137/1 |
| 5,441,076 | 8/1995 | Moriya et al. ....................... 137/486 |
| 5,497,316 * | 3/1996 | Sierk et al. ..................... 364/140.01 |
| 5,518,528 | 5/1996 | Tom et al. . |
| 5,605,179 * | 2/1997 | Strong, Jr. et al. .................. 137/884 |
| 5,749,389 * | 5/1998 | Ritrosi et al. ........................ 137/240 |
| 5,771,178 | 6/1998 | Stemporzewski, Jr. et al. ..... 364/510 |
| 5,791,369 | 8/1998 | Nishino et al. ...................... 137/269 |
| 5,819,782 * | 10/1998 | Itafuji ................................. 137/240 |
| 5,865,205 * | 2/1999 | Wilmer ................................. 137/2 |
| 6,012,478 * | 1/2000 | Park ..................................... 137/240 |

* cited by examiner

*Primary Examiner*—George L. Walton
(74) *Attorney, Agent, or Firm*—Oliver A. Zitzmann; Steven J. Hultquist

(57) ABSTRACT

An auto-switching sub-atmospheric pressure gas delivery system, for dispensing gas to a gas-consuming process unit, e.g., a semiconductor manufacturing tool. The gas delivery system uses a multiplicity of gas panels, wherein one panel is in active gas dispensing mode and supplying gas from a sub-atmospheric pressure gas source coupled to the flow circuitry of the panel. During the active gas dispensing operation in such panel, a second gas panel of the system undergoes purge, evacuation and fill transition to active gas dispensing condition, to permit switching to the second panel upon exhaustion of the sub-atmospheric pressure gas source coupled to the first gas panel without the occurrence of pressure spikes or flow perturbations.

31 Claims, 1 Drawing Sheet

AUTO-SWITCHING GAS DELIVERY SYSTEM UTILIZING SUB-ATMOSPHERIC PRESSURE GAS SUPPLY VESSELS

BACKGROUND OF THE INVENTION

1. Field of the Invention

This invention relates to a sub-atmospheric pressure gas delivery system for supplying gas to a gas-consuming process facility such as a semiconductor manufacturing tool, wherein the system utilizes sub-atmospheric gas supply vessels and is auto-switchable in character from an empty vessel to a full one without pressure spikes or flow perturbations.

2. Description of the Related Art

Modem semiconductor fabrication plant (fab) operations demand continuous delivery of process chemicals to maximize tool and fab uptime and utilization. For the continuous delivery of compressed and compressed liquefied process gases from supply vessels, conventional delivery systems typically incorporate an automated switching function. This auto-switch function, as it is known, allows users to swap supply cylinders without necessitating the shut-down of critical processes in the fab.

The method of auto-switch for compressed and compressed, liquefied gases is quite simple. Both compressed and compressed liquefied gases are delivered at pressures above atmospheric pressure in the delivery line to the process tool.

For compressed gases, most delivery systems use regulators to step down high cylinder pressures, e.g., 800–1200 psig, to working pressures of 20–100 psig. Compressed gas cylinders are generally changed out and removed from service when the cylinder pressures reach between 100–200 psig. This typically means that the delivery line pressure, i.e., the pressure downstream of the delivery regulator, is not affected by the gradual loss in cylinder pressure, provided that the cylinder pressure remains above the delivery line pressure setpoint—which is the intent of the designs of virtually all compressed gas delivery systems.

For compressed liquefied gases, similar designs have been made. The most obvious difference can be found for lower pressure compressed liquefied gases such as $BCl_3$ and $WF_6$, which have cylinder pressures of 4.4 and 2.4 psig, respectively. These systems do not necessarily rely on regulators for maintaining constant delivery line pressures. Instead, most of these compressed liquefied gas delivery systems rely on cylinder and delivery line heating to maintain constant pressures in the delivery line. Such constant delivery line pressures may be positive or negative. By way of illustration, the constant pressure in the delivery line for dispensing of $WF_6$ may be on the order of about 12 psia.

In either case, for compressed gases or compressed liquefied gases, the fundamental design of the dispensing system provides consistent pressure in the process delivery line. This design capability makes auto-switching a matter of toggling the isolation valve of identical delivery manifolds. The pressure in the delivery line is not drastically different from one compressed cylinder to another when the auto-switch mechanism is enabled. As a result, the downstream process is not exposed to any pressure fluctuations during auto-switch of the dispensing system.

Enabling an auto-switch function for sub-atmospheric gas sources is difficult with current process gas delivery systems for compressed and compressed liquefied gases. The main reason for this is that conventional compressed and compressed liquefied gas systems are designed for "consistent" or "stable" pressure operation. These systems neither provide the capability to deliver consistent sub-atmospheric pressure gas nor the functionality to switch automatically between two sub-atmospheric cylinders that may be at different absolute pressures. Based on the current state of the art, switching between "empty" and "full" sub-atmospheric cylinders would result in pressure spikes throughout the tool and associated gas flow lines. Such pressure spikes can result in particle generation and mass flow inconsistency and instability, both of which can negatively affect process performance and capability.

Unlike compressed gas delivery systems, the current design of single cylinder sub-atmospheric delivery systems does not include the use of mechanical regulators such as diaphragm regulators. There are various reasons for this. One reason is that conventional mechanical regulators induce unwanted pressure drop. Further, mechanical regulators are not available that are capable of efficient operation at very low subatmospheric pressures. Indeed, most conventional mechanical regulators cannot be configured to operate at pressures below about 300 Torr. Without the use of regulators, the absolute pressure of sub-atmospheric gas in the delivery line from a sub-atmospheric gas delivery system is nearly equal to that of the sub-atmospheric gas cylinder. As such, the pressure in the delivery line will decrease as gas is extracted and transported from the sub-atmospheric cylinder. Sub-atmospheric cylinder pressures range from 10–700 Torr, depending on the fill state of the cylinder. The pressure of a "fill" sub-atmospheric cylinder is 650–700 Torr. "Empty" sub-atmospheric cylinders have pressures of 10–30 Torr. The auto-switch between these two states is not recommended for the reasons mentioned in the previous paragraph. A control mechanism is needed that ensures a gradual transition from the pressure conditions of empty sub-atmospheric cylinders to those of full sub-atmospheric cylinders.

Sub-atmospheric pressure gas supply sources of the aforementioned type include the sorbent-based gas storage and dispensing systems disclosed in U.S. Pat. No. 5,518,528 issued May 21, 1996 in the names of Glenn M. Tom and James V. McManus. The gas storage and dispensing system of the Tom et al. patent comprises an adsorption-desorption apparatus, for storage and dispensing of a gas, e.g., a hydride gas, halide gas, organometallic Group V compound, etc. The sorbent-based gas storage and dispensing system of the Tom et al. patent reduces the pressure of stored sorbate gases by reversibly adsorbing them onto a carrier sorbent medium such as a zeolite or activated carbon material, for subsequent dispensing by pressure differential-mediated and/or thermal differential-mediated desorption, optionally with flow of a carrier gas through the gas storage and dispensing vessel providing a concentration differential mediating desorption of the stored gas from the sorbent in the sub-atmospheric pressure supply vessel.

In a typical arrangement of a sorbent-based gas storage and dispensing system of the type described in the Tom et al. patent, a dispensing assembly is coupled in gas flow communication with the storage and dispensing vessel containing the solid-phase sorbent having gas sorbed thereon. The gas dispensing assembly in such system is constructed and arranged to provide, exteriorly of the storage and dispensing vessel, a pressure below the interior vessel pressure, to effect desorption of sorbate gas from the solid-phase physical sorbent medium, and gas flow of desorbed gas through the dispensing assembly.

The storage and dispensing vessel of the Tom et al. patent thus embodies a substantial improvement over high pressure gas cylinders, particularly where hazardous gases are involved. Conventional high pressure gas cylinders are susceptible to leakage from damaged or malfunctioning regulator assemblies, as well as to rupture or other unwanted bulk release of gas from the cylinder if internal decomposition of the gas leads to rapid increasing interior gas pressure in the cylinder.

It is accordingly an object of the present invention to provide an auto-switching sub-atmospheric pressure gas delivery system.

It is another object of the invention to provide an auto-switching sub-atmospheric pressure gas delivery system for sub-atmospheric pressure sorbent-based gas storage and dispensing vessels.

Other objects and advantages of the invention will be more fully apparent from the ensuing disclosure and appended claims.

SUMMARY OF THE INVENTION

The present invention relates to an auto-switching sub-atmospheric pressure gas delivery system for dispensing of sub-atmospheric pressure gas for use in applications such as the manufacture of semiconductor products.

In one aspect, the present invention relates to an auto-switching sub-atmospheric pressure gas delivery system, comprising:

(a) a multiplicity of gas panels, each of which comprises gas flow circuitry including a product gas flow line coupleable to a sub-atmospheric pressure gas source for flow of dispensed gas therethrough, a purge gas line coupleable to a purge gas source for flow of purge gas therethrough and optionally having a purge gas particle filter in the purge line, a pressure-controlled flow regulator in the product gas flow line, and selectively actuatable valves for selectively and independently isolating each of the product gas flow line and the purge gas line in the gas flow circuitry of the panel to prevent flow of gas therethrough;

(b) a product gas manifold interconnecting the product gas flow lines in each of the gas panels, for discharge of product gas from the product gas flow line of an active dispensing one of said gas panels;

(c) a purge gas manifold coupled in gas flow communication with the product gas flow lines and with the purge gas lines in each of the gas panels;

(d) a selectively actuatable evacuation driver arranged to exhaust gas from the flow circuitry of a non-dispensing one of said gas panels through said purge gas manifold; and (e) a central processing unit (CPU) arranged to selectively actuate:

(1) in each of the gas panels, the selectively actuatable valves, and (2) the selectively actuatable evacuation driver, so that each of the gas panels operates sequentially, alternatingly and repetitively in operational modes including (I) an active dispensing operational mode in which gas from the sub-atmospheric pressure gas source is flowed through the product gas flow line to the product gas manifold, (II) a purging operational mode in which purge gas from the purge gas source is flowed through the purge gas line and into the product gas flow line and purge gas manifold, (III) an evacuation operational mode in which the purge gas line, product gas flow line and purge gas manifold are evacuated under action of the evacuation driver, and (IV) a fill transition to active gas dispensing condition operating mode in which the product gas flow line is filled with product gas from the product gas manifold and the pressure-controlled flow regulator in the product gas flow line operates to regulate flow of product gas from the sub-atmospheric pressure gas source through the product gas flow line to the product gas manifold for re-initiation of (I) the active dispensing operational mode.

Another aspect of the present invention relates to an auto-switching sub-atmospheric pressure gas delivery process, comprising:

(a) providing: a multiplicity of gas panels, each of which comprises gas flow circuitry including a product gas flow line coupleable to a sub-atmospheric pressure gas source for flow of dispensed gas therethrough, a purge gas line coupleable to a purge gas source for flow of purge gas therethrough and optionally having a purge gas particle filter in the purge line, a pressure-controlled flow regulator in the product gas flow line, and selectively actuatable valves for selectively and independently isolating each of the product gas flow line and the purge gas line in the gas flow circuitry of the panel to prevent flow of gas therethrough; a product gas manifold interconnecting the product gas flow lines in each of the gas panels, for discharge of product gas from the product gas flow line of an active dispensing one of said gas panels; a purge gas manifold coupled in gas flow communication with the product gas flow lines and with the purge gas lines in each of the gas panels; and a selectively actuatable evacuation driver arranged to exhaust gas from the flow circuitry of a non-dispensing one of said gas panels through said purge gas manifold; and (b) selectively actuating:

(1) in each of the gas panels, the selectively actuatable valves, and (2) the selectively actuatable evacuation driver, to sequentially, alternatingly and repetitively operate each of the gas panels in operational modes including (I) an active dispensing operational mode in which gas from the sub-atmospheric pressure gas source is flowed through the product gas flow line to the product gas manifold, (II) a purging operational mode in which purge gas from the purge gas source is flowed through the purge gas line and into the product gas flow line and purge gas manifold, (III) an evacuation operational mode in which the purge gas line, product gas flow line and purge gas manifold are evacuated under action of the evacuation driver, and (IV) a fill transition to active gas dispensing condition operating mode in which the product gas flow line is filled with product gas from the product gas manifold and the pressure-controlled flow regulator in the product gas flow line operates to regulate flow of product gas from the sub-atmospheric pressure gas source through the product gas flow line to the product gas manifold for re-initiation of (I) the active dispensing operational mode.

A still further aspect of the invention relates to a process for delivering a product gas from a sub-atmospheric pressure product gas source by a manifolded gas cabinet flow circuit arranged in multiple gas panels each of which is coupleable to a respective sub-atmospheric pressure product gas source vessel, in which the process comprises:

(a) operating a first panel in an active product gas dispensing mode and supplying product gas from a sub-atmospheric pressure gas source coupled to the flow circuitry of said first panel, and (b) during the active gas dispensing mode in said first panel, purging a second one of said multiple gas panels with a purge gas, evacuating the flow circuitry of said second panel, and filling the flow circuitry of said second panel with product gas deriving from said first panel and with product gas from a sub-atmospheric pressure gas source coupled to the flow circuitry of said second panel, to place said second panel in an active gas dispensing condition; and (c) switching the second panel to an active product gas dispensing mode upon exhaustion of the sub-atmospheric pressure gas source coupled to the first gas panel while controlling the product gas flow from the flow circuitry of the second panel to avoid the occurrence of pressure spikes or flow perturbations.

Other aspects, features and embodiments in the invention will be more fully apparent from the ensuing disclosure and appended claims.

DETAILED DESCRIPTION OF THE INVENTION, AND PREFERRED EMBODIMENTS THEREOF

Figure 1:
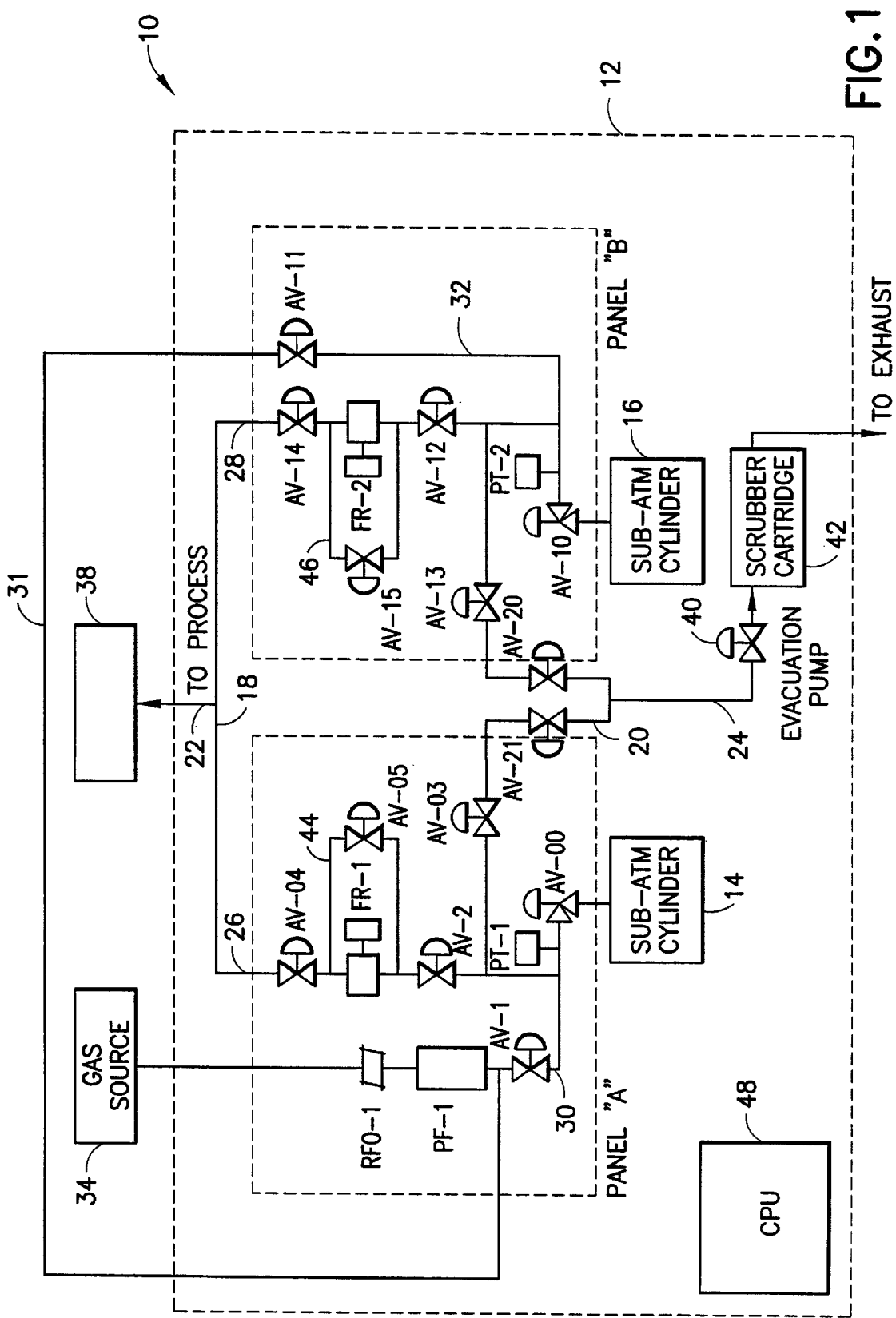
FIG. 1 is a schematic representation of an auto-switching sub-atmospheric pressure gas delivery system according to one embodiment of the present invention.

The present invention relates to a sub-atmospheric pressure gas delivery system having auto-switch capability that permits transition from an empty sub-atmospheric pressure gas supply vessel to a full sub-atmospheric pressure gas supply vessel. The system of the invention allows for uninterrupted delivery of sub-atmospheric pressure gas to individual or multiple process tools or to a sub-atmospheric pressure gas distribution system.

An illustrative embodiment of the sub-atmospheric pressure gas delivery system of the invention is schematically shown in FIG. 1.

As illustrated in FIG. 1, the sub-atmospheric pressure gas delivery system 10 comprises a gas cabinet assembly 12 schematically depicted in dashed line representation, and including two individual gas cabinet enclosures that are connected to one another, with each such enclosure housing a respective one of the two gas panels. The gas cabinet for each panel may comprise a unitary enclosure and be equipped with access doors, gas supply vessel securement members, etc., as is known in the art.

The gas delivery system 10 as illustrated includes respective gas panel assemblies, denoted "PANEL A" and "PANEL B" in the Figure, which are generally symmetrical to one another, comprising piping, valving, flow control and processing monitoring means, for gas delivery, purge and evacuation modes of operation. As described hereinabove, PANEL A is in a first gas cabinet and PANEL B is in a second gas cabinet, with each of the gas cabinets being connected to one another. Each of the gas panels may be integrated with (interactively coupled to) a single central processing unit (CPU) 48.

The respective gas panel assemblies are coupled with product gas discharge manifold line 18, to which is joined the product discharge flow line 22. The product discharge flow line 22 is in turn connected to the gas-consuming facility 38, which may comprise for example a semiconductor manufacturing tool or other process unit.

In the gas delivery system 10, the automatic valves are denoted by the prefix "AV-" followed by a number for the specific valve unit. Restricted flow orifice elements are employed in the system and are denoted by the prefix "RFO-" followed by the number of the specific restricted flow orifice unit. Particle filters are denoted by the prefix "PF-" followed by the number of the specific particle filter unit. Pressure transducer elements are denoted by the prefix "PT-" followed by the number of the specific pressure transducer unit. Pressure-controlled flow regulating devices are denoted by the prefix "FR-" followed by the number of the specific pressure-controlled flow-regulating device.

As illustrated, PANEL A includes a purge line 30 coupled with the purge gas source 34. The purge gas source 34 may comprise a cylinder or other supply container, or a "house" bulk purge source of purge gas for selective flow of purge gas through the purge line 30. The purge line 30 contains automatic valve AV-1, restricted flow orifice RFO-1, and an optional particle filter PF-1. The PANEL A main gas flow line 26 interconnects the product gas discharge manifold line 18 with the sub-atmospheric pressure gas supply vessel 14, as well as the purge gas manifold line 20. The purge line 30 is coupled via line 31 to purge line 32 of PANEL B, so that purge gas source 34 serves both PANEL A and PANEL B.

By way of specific example, the sub-atmospheric pressure gas supply vessel 14 may comprise a sorbent-based gas storage and dispensing vessel of the type shown and described in U.S. Pat. No. 5,518,528, e.g., a "JY" cylinder containing a physical sorbent material having sorptive affinity for the gas to be dispensed, such as a bead activated carbon sorbent loaded with about 0.5 kilogram of arsine gas. The disclosure of U.S. Pat. No. 5,518,528 to Tom et al. is hereby incorporated by reference herein in its entirety. In the gas dispensing mode, arsine gas is flowed from the supply vessel 14 through the main gas flow line 26, the product gas discharge manifold line 18 and the product discharge flow line 22 to the gas-consuming facility 38, which may comprise a CVD tool, e.g., for the deposition and incorporation of arsenic and phosphorus atoms in thin film substrates used in the manufacture of microelectronic device structures.

The main gas flow line 26 is coupled to the supply vessel 14 by a valve head assembly including a valve AV-00. The main gas flow line 26 contains a pressure transducer PT-1, automatic valve AV-2, pressure-controlled flow regulating device FR-1, and automatic valve AV-04, and such line 26 is coupled with optional by-pass flow control loop 44 containing automatic valve AV-05.

PANEL B is correspondingly constructed to PANEL A. PANEL B comprises a purge line 32 coupled with the purge gas source 34 via line 31 joined to purge line 30, as shown. The purge gas source 34 as mentioned may comprise a cylinder or other supply container having a suitable purge gas therein. The purge gas source 34 supplies purge gas that is selectively flowable through the purge line 32. Alternatively, the purge gas source 34 instead of being a single source from which purge gas is selectively dispensable to each of the purge lines 30 and 32 in sequence, may otherwise comprise separate purge gas sources associated directly with each of the respective PANELS A and B. With such separate purge gas sources, the purge gas line 32 in PANEL B would be configured analogously to purge gas line 30 in PANEL A, and may include a restricted flow orifice and optional particle filter as shown for the purge gas line 30 in PANEL A.

The purge line 32 contains automatic valve AV-11. The PANEL B main gas flow line 28 interconnects the product gas discharge manifold line 18 with the sub-atmospheric pressure gas supply vessel 16, as well as the purge gas manifold line 20.

The main gas flow line 28 is coupled to the supply vessel 16 by a valve head assembly including a valve AV-10. The main gas flow line 28 contains a pressure transducer PT-2, automatic valve AV-12, pressure-controlled flow regulating device FR-2, and automatic valve AV-14. Line 28 also is provided with optional by-pass flow control loop 46 containing automatic valve AV-15.

Purge gas manifold line 20 interconnects the main gas flow lines 26 and 28 as shown. Automatic valves AV-03 and AV-13 are provided in the PANEL A and PANEL B segments of the purge gas manifold line 20, respectively. The purge gas manifold line 20 in turn is joined to purge gas discharge line 24 containing evacuation pump 40 and optional scrubber cartridge 42. The scrubber cartridge 42 may comprise an in-line canister containing a suitable chemisorbent or scavenger material which effects removal from the purge gas of undesired gas component(s) prior to exhaust of the purge gas from the gas cabinet 12. The exhausted purge gas may be sent to exhaust from the system, recycled in the system, and/or treated in whole or part for abatement of the contaminants therein.

In this respect, the integral scrubbing cartridge 42 in the purge gas discharge line 24 functions to capture residual emissions from the evacuation vacuum pump 40. The use of sub-atmospheric pressure gas cylinders in conjunction with the integrated scrubber makes the design and operation of the gas cabinet much safer.

The evacuation pump 40 may suitably comprise a vacuum pump although other devices may be employed, e.g., eductors, ejectors, cryopumps, fans, blowers, etc. The isolation valves, automatic valves AV-03 and AV-13, isolate the vacuum drive component, evacuation pump 40, from the panels' evacuation circuitry. The individual panels allow for local pump purging, local evacuation, and isolated cylinder changing.

The process delivery lines comprise indicating pressure transducers (PT-1 in PANEL A; PT-2 in PANEL B) at each cylinder (supply vessel 14 for PANEL A; supply vessel 16 for PANEL B), high flow, i.e., high CV, valves (AV-00 for supply vessel 14; AV-10 for supply vessel 16), and downstream pressure control devices (AV-2, FR-1 and AV-4 in PANEL A; AV-12, FR-2 and AV-14 in PANEL B), including optional bypass loops (loop 44 containing AV-05 in PANEL A; loop 46 containing AV-15 in PANEL B).

The flow control devices FR-1 and FR-2 are used to ensure a smooth transition during switching from empty to full sub-atmospheric pressure cylinders in the respective PANELS A and B. That is, the flow control devices FR-1 and FR-2 prevent the pressure in the full cylinder from spiking the downstream delivery system and, thus, the process tool. The flow control devices FR-1 and FR-2 may each comprise a commercially available device such as the MKS 640 Series pressure controller (available from MKS Instruments, Inc.) or a pressure control assembly comprising a combination of a downstream pressure transducer, a variable setting (proportioning) control valve, and a PID controller, which may be included in the system's overall process control system. Preferred flow control devices in the broad practice of the invention include the Model SR-3 and Model SR-4 subatmospheric pressure regulators commercially available from Integrated Flow Systems, Inc. (Santa Cruz, Calif.), which may be selectively set at pressure settings, e.g., at a pressure in the range of from about 20 to about 50 Torr.

The sub-atmospheric pressure gas delivery system 10 may also comprise in the gas cabinet a central processing unit (CPU) 48, which may be operatively linked to the valves, controllers and actuators in the system, for control of such system components according to a cycle time control program or in other automatically controlled manner. The CPU may comprise a programmable computer, microprocessor, or other microelectronic unit for such purpose. Preferably, the CPU comprises a programmable logic controller (PLC).

The CPU alternatively may be situated outside of the cabinet 12 and operatively linked to the valves, controllers and actuators of the system in a suitable fashion, e.g., by signal transmission wires, wireless (e.g., infrared) link, etc.

A typical auto-switch operation of the sub-atmospheric pressure gas delivery system 10 of FIG. 1 is now described, wherein PANEL A is in an "Operating" mode and PANEL B is in a "Stand-By" mode, and sub-atmospheric pressure cylinders 14 and 16 are connected to the respective PANEL A and PANEL B assemblies.

In PANEL A, gas from sub-atmospheric pressure supply cylinder 14 is flowed through the open valve AV-00 in main gas flow line 26, with valves AV-2 and AV-04 also being open, so that the supplied gas passes into product gas discharge manifold line 18 and is discharged from the gas cabinet 12 into product discharge flow line 22 for flow to the gas-consuming facility 38.

During such dispensing operation in PANEL A, the valves AV-1 and AV-3 are closed. The pressure transducer PT-1 monitors the pressure of the dispensed gas from sub-atmospheric pressure supply cylinder 14, and the monitored pressure is inputted to the CPU 48 for control purposes, while the pressure-controlled flow regulating device FR-1 controls the flow of the dispensed gas to the gas-consuming facility 38 in accordance with the requirements of the facility.

When sub-atmospheric pressure supply cylinder 14 connected to PANEL A approaches an empty condition, PANEL B is automatically readied under the control of the CPU 48 for switching. The empty and near-empty states of the sub-atmospheric pressure cylinders may be defined by the end-user by programming the CPU, or the respective empty and near-empty set points may be pre-set in the CPU as furnished to the end-user.

Readying PANEL B for switching entails performing purge and evacuation cycles and charging PANEL B with sub-atmospheric pressure gas. During these process steps, the pressure-controlled flow regulating device FR-2 will be fully closed using a direct digital signal from the CPU 48, e.g., by a system programmable logic controller (PLC) of such CPU.

In the purging of PANEL B, purge gas from the purge gas source 34 is flowed from line 31 into purge line 32 to the purge gas manifold line 20 and exhausted from the gas cabinet 12 in purge gas discharge line 24 under the action of the evacuation pump 40. During the purge step, the valves AV-11, AV-13 and AV-20 are open, and valves AV-10, AV-12 and AV-14 are closed. The purge gas from source 34 is flowed in line 30 through the restricted flow orifice RFO-1 to prevent the occurrence of pressure surges and regulate the pressure drop in the purge flow circuit. Alternatively, the respective valves AV-11 and AV-13 can be toggle-sequenced, to selectively pressurize the corresponding segments of line 32 in PANEL B (or, correspondingly, valves AV-1 and AV-3 in the analogous sequence in PANEL A), followed by vacuum extraction of the purge gas from the line, in the purge operation.

After the purging step, the valve AV-11 is closed, and the purge flow circuit comprising purge gas discharge line 24 and purge gas manifold line 20 is evacuated under the continuing action of the evacuation pump 40. After evacuation has been completed, the valves AV-13 and AV-20 are closed, and the gas dispensing circuitry of PANEL B (comprising main gas flow line 28) is refilled with product gas and brought to active dispensing condition.

To effect the refill of the gas dispensing circuitry of PANEL B for active dispensing, valve AV-14 is opened in main gas flow line 28 and the pressure transducer of the pressure-controlled flow regulating device FR-2 of PANEL B is exposed to the delivery line pressure, which is that of the sub-atmospheric pressure gas supply vessel 14 that is connected to PANEL A and still in the active dispensing mode.

When the pressure in the product discharge flow line 22 reaches the lower or "empty" setpoint, as sensed by the pressure transducer of the pressure-controlled flow regulating device FR-2 of PANEL B, then valves AV-10 and AV-12 of PANEL B open. At this point, the digital signal that closes the pressure-controlled flow regulating device FR-2 control valve is terminated, and the pressure-controlled flow regulating device FR-2 begins operating to keep the pressure of PANEL B within 10 Torr above that of PANEL A. Simultaneously, valves AV-2 and AV-4 in PANEL A close and a pump/purge cycle begins to remove residual gas from PANEL A.

The pressure-controlled flow regulating device FR-2 slowly opens its proportioning control valve to a "fully open" state in a manner such that the rate of rise of process gas in the delivery line is less than 20 Torr/minute, which is the rate that most mass flow controllers (MFCs) can withstand without compromising flow stability.

Once the delivery line pressure at the pressure-controlled flow regulating device FR-2 equals that of the sub-atmospheric pressure gas supply vessel 16 as determined by pressure transducer PT-2, the pressure-controlled flow regulating device FR-2 can be fully opened to provide unrestricted flow.

At this point, PANEL A is "off-line" (inactive with respect to dispensing of product gas) and may undergo the purging/evacuation and fill sequence described hereinabove for PANEL B. PANEL B during such purging/evacuation and fill sequence of PANEL A continues to dispense product gas.

With valve AV-00 in PANEL A being closed during the purging/evacuation and fill sequence in such panel, the "used" sub-atmospheric pressure gas supply vessel 14 in PANEL A can be changed out—i.e., removed and replaced by a fresh (full) sub-atmospheric pressure gas supply vessel, for subsequent renewed operation of PANEL A as the active gas dispensing panel of the gas delivery system when the sub-atmospheric pressure gas supply vessel in PANEL B is exhausted, and the aforementioned auto-switching procedure is carried out.

It is preferred to avoid the use of the pressure-controlled flow regulating device FR-2 as a fixed regulator, in order to provide the end-user with the capability to employ a mass flow controller (MFC) in the gas-consuming facility 38 as a measure of the remaining product gas in the sub-atmospheric pressure gas supply vessel that is supplying product gas to the facility. The end-user may for example record the MFC's valve voltage reading and use such valve voltage reading as the measure of the approach to the sub-atmospheric pressure gas supply vessel's "empty" state. The MFC valve voltage increases proportionally with decreasing pressure in the sub-atmospheric pressure gas supply vessel, and it is preferred from an MFC accuracy standpoint to operate at higher base pressures, e.g., >20 Torr.

Although the FIG. 1 embodiment of the invention has been illustratively shown and described with reference to a gas delivery system utilizing two gas panels (PANEL A and PANEL B), it will be appreciated that the invention is not limited in such respect, and that more than two gas panels may be employed in a given end use application of the present invention, wherein each panel undergoes the cycle steps just described (active gas dispensing, purge, evacuation and fill transition to dispensing condition), in a sequence that is automatically switched with respect to the constituent gas panels.

It will therefore be seen that the gas delivery system of the invention permits continuous dispensing operation to take place, with one of the multiple gas panels being an active dispensing panel, and the other(s) being purged, evacuated and fill transitioned in sequence.

This auto-switching system of the invention prevents large pressure waves from being propagated through the delivery line as a result of auto-switching between empty and full sub-atmospheric pressure cylinders. Such auto-switching system ensures continuous delivery of sub-atmospheric pressure gas in applications in which fungible sub-atmospheric pressure gas cylinders may be stockpiled to provide a cylinder inventory from which a fresh cylinder may be readily installed during the change-out for a given gas panel.

Additionally, the operation of the gas delivery system of the invention prevents the occurrence of pressure spikes during the auto-switch operation and thereby serves to minimize particle shedding from individual system components. As a result, the purity of the gas dispensed by the gas delivery system is maintained at a high level, as is necessary in gas-consuming operations such as semiconductor manufacturing, in which deviations from the set point purity level may yield a semiconductor product that is defective or even useless for its intended purpose.

While the invention has been illustratively described herein with reference to specific elements, features and embodiments, it will be recognized that the invention is not thus limited in structure or operation, but rather is intended to be broadly construed in view of the disclosure herein, as comprehending variations, modifications and other embodiments as will readily suggest themselves to those of ordinary skill in the art.

What is claimed is:

1. An auto-switching sub-atmospheric pressure gas delivery system, comprising:
   (a) a multiplicity of gas panels, each of which comprises gas flow circuitry including a product gas flow line coupleable to a sub-atmospheric pressure gas source for flow of dispensed gas therethrough, a purge gas line coupleable to a purge gas source for flow of purge gas therethrough, a pressure-controlled flow regulator in the product gas flow line, and selectively actuatable valves for selectively and independently isolating each of the product gas flow line and the purge gas line in the gas flow circuitry of the panel to prevent flow of gas therethrough;
   (b) a product gas manifold interconnecting the product gas flow lines in each of the gas panels, for discharge of product gas from the product gas flow line of an active dispensing one of said gas panels;
   (c) a purge gas manifold coupled in gas flow communication with the product gas flow lines and with the purge gas lines in each of the gas panels;
   (d) a selectively actuatable evacuation driver arranged to exhaust gas from the flow circuitry of a non-dispensing one of said gas panels through said purge gas manifold; and (e) a central processing unit (CPU) arranged to selectively actuate:
(1) in each of the gas panels, the selectively actuatable valves, and
(2) the selectively actuatable evacuation driver, so that each of the gas panels operates sequentially, alternatingly and repetitively in operational modes including (I) an active dispensing operational mode in which gas from the sub-atmospheric pressure gas source is flowed through the product gas flow line to the product gas manifold, (II) a purging operational mode in which purge gas from the purge gas source is flowed through the purge gas line and into the product gas flow line and purge gas manifold, (III) an evacuation operational mode in which the purge gas line, product gas flow line and purge gas manifold are evacuated under action of the evacuation driver, and (IV) a fill transition to active gas dispensing condition operating mode in which the product gas flow line is filled from the product gas manifold with product gas deriving from another gas panel in an active dispensing operational mode, said active dispensing operational mode of said another gas panel is terminated, and the pressure-controlled flow regulator in the product gas flow line operates to regulate flow of product gas from the sub-atmospheric pressure gas source through the product gas flow line to the product gas manifold for re-initiation of (I) the active dispensing operational mode, at a rate avoiding the occurrence of product gas pressure spikes.

2. The auto-switching sub-atmospheric pressure gas delivery system of claim 1, comprising at least two gas panels.

3. The auto-switching sub-atmospheric pressure gas delivery system of claim 1, comprising two gas panels.

4. The auto-switching sub-atmospheric pressure gas delivery system of claim 1, wherein each of the gas panels is enclosed in a respective separate gas cabinet.

5. The auto-switching sub-atmospheric pressure gas delivery system of claim 4, wherein each of the gas panels is integrated with a single central processing unit (CPU).

6. The auto-switching sub-atmospheric pressure gas delivery system of claim 1, further comprising a sub-atmospheric pressure gas source coupled to the product gas flow line of the gas panel in the active dispensing operational mode (I).

7. The auto-switching sub-atmospheric pressure gas delivery system of claim 1, wherein the sub-atmospheric pressure gas source comprises a gas storage and dispensing vessel containing a solid-phase physical adsorbent having adsorbed thereon a gas for which the solid-phase physical adsorbent is physically adsorptive.

8. The auto-switching sub-atmospheric pressure gas delivery system of claim 7, wherein said gas comprises a gas species selected from the group consisting of hydride gases, halide gases and organometallic compound gases.

9. The auto-switching sub-atmospheric pressure gas delivery system of claim 1, wherein the product gas manifold is coupled to a process tool of a semiconductor manufacturing facility.

10. The auto-switching sub-atmospheric pressure gas delivery system of claim 1, wherein the central processing unit (CPU) comprises a programmable logic controller.

11. The auto-switching sub-atmospheric pressure gas delivery system of claim 1, wherein the purge gas manifold is joined in gas flow communication with a purge gas discharge line having the evacuation driver coupled thereto.

12. The auto-switching sub-atmospheric pressure gas delivery system of claim 11, wherein the purge gas discharge line has a scrubber unit disposed therein for removing contaminants of the purge gas flowed therethrough.

13. The auto-switching sub-atmospheric pressure gas delivery system of claim 1, wherein the gas flow circuitry is arranged as shown in FIG. 1.

14. The auto-switching sub-atmospheric pressure gas delivery system of claim 1, wherein the purge gas line has a restricted flow orifice disposed therein.

15. The auto-switching sub-atmospheric pressure gas delivery system of claim 1, wherein the purge gas line has a particle filter disposed therein.

16. The auto-switching sub-atmospheric pressure gas delivery system of claim 1, wherein each of the gas panels is disposed in a separate respective gas cabinet, and the respective gas cabinets are coupled together as a unitary assembly.

17. The auto-switching sub-atmospheric pressure gas delivery system of claim 1, wherein the gas flow circuitry has a pressure transducer disposed therein for monitoring pressure of gas flowed into the product gas flow line from the sub-atmospheric pressure gas source.

18. The auto-switching sub-atmospheric pressure gas delivery system of claim 1, wherein the evacuation driver comprises a vacuum pump.

19. An auto-switching sub-atmospheric pressure gas delivery process, comprising:
(a) providing: a multiplicity of gas panels, each of which comprises gas flow circuitry including a product gas flow line coupleable to a sub-atmospheric pressure gas source for flow of dispensed gas therethrough, a purge gas line coupleable to a purge gas source for flow of purge gas therethrough, a pressure-controlled flow regulator in the product gas flow line, and selectively actuatable valves for selectively and independently isolating each of the product gas flow line and the purge gas line in the gas flow circuitry of the panel to prevent flow of gas therethrough; a product gas manifold interconnecting the product gas flow lines in each of the gas panels, for discharge of product gas from the product gas flow line of an active dispensing one of said gas panels; a purge gas manifold coupled in gas flow communication with the product gas flow lines and with the purge gas lines in each of the gas panels; and a selectively actuatable evacuation driver arranged to exhaust gas from the flow circuitry of a non-dispensing one of said gas panels through said purge gas manifold;
(b) selectively actuating:
(1) in each of the gas panels, the selectively actuatable valves, and
(2) the selectively actuatable evacuation driver, to sequentially, alternatingly and repetitively operate each of the gas panels in operational modes including (I) an active dispensing operational mode in which gas from the sub-atmospheric pressure gas source is flowed through the product gas flow line to the product gas manifold, (II) a purging operational mode in which purge gas from the purge gas source is flowed through the purge gas line and into the product gas flow line and purge gas manifold, (III) an evacuation operational mode in which the purge gas line, product gas flow line and purge gas manifold are evacuated under action of the evacuation driver, and (IV) a fill transition to active gas dispensing condition operational mode in which the product gas flow line is filled with product gas from the product gas manifold deriving from another gas panel in an active dispensing operational mode said active dispensing operational mode of said another gas panel is terminated and the pressure-controlled flow regulator in the product gas flow line operates to regulate flow of product gas from the sub-atmospheric pressure gas source through the product gas flow line to the product gas manifold for re-initiation of (I) the active dispensing operational mode, at a rate avoiding the occurrence of product gas pressure spikes.

20. The auto-switching sub-atmospheric pressure gas delivery process of claim 19, comprising operating at least two gas panels.

21. The auto-switching sub-atmospheric pressure gas delivery process of claim 19, comprising operating two gas panels.

22. The auto-switching sub-atmospheric pressure gas delivery process of claim 19, comprising dispensing gas from a sub-atmospheric pressure gas source coupled to the product gas flow line of the gas panel in the active dispensing operational mode (I).

23. The auto-switching sub-atmospheric pressure gas delivery process of claim 19, wherein the sub-atmospheric pressure gas source comprises a gas storage and dispensing vessel containing a solid-phase physical adsorbent having adsorbed thereon a gas for which the solid-phase physical adsorbent is physically adsorptive.

24. The auto-switching sub-atmospheric pressure gas delivery process of claim 23, wherein said gas comprises a gas species selected from the group consisting of hydride gases, halide gases and organometallic compound gases.

25. The auto-switching sub-atmospheric pressure gas delivery process of claim 19, comprising flowing product gas from the product gas manifold to a process tool of a semiconductor manufacturing facility.

26. The auto-switching sub-atmospheric pressure gas delivery process of claim 19, wherein each of the gas panels is disposed in a separate respective gas cabinet, and the respective gas cabinets are coupled together as a unitary assembly.

27. The auto-switching sub-atmospheric pressure gas delivery process of claim 19, further comprising scrubbing the purge gas to remove contaminants therefrom.

28. The auto-switching sub-atmospheric pressure gas delivery process of claim 19, further comprising monitoring pressure of gas flowed into the product gas flow line from the sub-atmospheric pressure gas source.

29. The auto-switching sub-atmospheric pressure gas delivery process of claim 19, comprising vacuum pumping the product gas flow line and the purge gas flow line in step (III).

30. The auto-switching sub-atmospheric pressure gas delivery process of claim 19, further comprising using the product gas in manufacturing a semiconductor device structure.

31. A process for delivering a product gas from a sub-atmospheric pressure product gas source by a manifolded gas cabinet flow circuit arranged in multiple gas panels each of which is coupleable to a respective sub-atmospheric pressure product gas source vessel, said process comprising:

(a) operating a first panel in an active product gas dispensing mode and supplying product gas from a sub-atmospheric pressure gas source coupled to the flow circuitry of said first panel, and (b) during the active gas dispensing mode in said first panel, purging a second one of said multiple gas panels with a purge gas, evacuating the flow circuitry of said second panel, and filling the flow circuitry of said second panel with product gas deriving from said first panel and with product gas from a sub-atmospheric pressure gas source coupled to the flow circuitry of said second panel, to place said second panel in an active gas dispensing condition; and (c) switching the second panel to an active product gas dispensing mode upon exhaustion of the sub-atmospheric pressure gas source coupled to the first gas panel while controlling the product gas flow from the flow circuitry of the second panel to avoid the occurrence of pressure spikes or flow perturbations, so that product gas is correspondingly continuously supplied during said switching.

* * * * *